US008526025B2

(12) United States Patent
Saito

(10) Patent No.: US 8,526,025 B2
(45) Date of Patent: Sep. 3, 2013

(54) IMAGE FORMING APPARATUS WITH TIME MEASURING SECTION FOR STOPPING OPERATION

(75) Inventor: Taku Saito, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 966 days.

(21) Appl. No.: 12/237,039

(22) Filed: Sep. 24, 2008

(65) Prior Publication Data

US 2009/0097051 A1 Apr. 16, 2009

(30) Foreign Application Priority Data

Oct. 15, 2007 (JP) ................................ 2007-267391

(51) Int. Cl.

| | |
|---|---|
| ***G06K 15/00*** | (2006.01) |
| ***G06F 1/00*** | (2006.01) |
| ***G06F 1/26*** | (2006.01) |
| ***G03G 15/00*** | (2006.01) |

(52) U.S. Cl.

USPC ............ 358/1.14; 713/300; 713/320; 399/24; 399/25

(58) Field of Classification Search

None

See application file for complete search history.

(56) References Cited

U.S. PATENT DOCUMENTS

| | | | | |
|---|---|---|---|---|
| 5,771,420 A | 6/1998 | Suzuki et al. | | |
| 5,857,131 A | 1/1999 | Hasegawa | | |
| 6,023,593 A * | 2/2000 | Tomidokoro | ..................... | 399/8 |
| 2002/0085870 A1 * | 7/2002 | Konishi et al. | .................. | 400/76 |
| 2006/0062583 A1 * | 3/2006 | Kikuchi | .......................... | 399/24 |
| 2006/0280537 A1 * | 12/2006 | Matsushima | ................... | 400/62 |
| 2007/0258112 A1 * | 11/2007 | Levine | .......................... | 358/448 |
| 2008/0114996 A1 * | 5/2008 | Suzuki | .......................... | 713/320 |
| 2008/0181625 A1 * | 7/2008 | Moodie et al. | .................. | 399/24 |

FOREIGN PATENT DOCUMENTS

| | | |
|---|---|---|
| JP | 54-153353 | 12/1979 |
| JP | 63-122349 | 5/1988 |
| JP | 4-80524 | 3/1992 |
| JP | 4-239679 | 8/1992 |
| JP | H4-317521 | 11/1992 |
| JP | 9-37461 | 2/1997 |
| JP | H9-147728 | 6/1997 |
| JP | 2000-19803 | 1/2000 |
| JP | 2000-184619 | 6/2000 |
| JP | 2005-016871 | 1/2005 |
| JP | 2006-126606 | 5/2006 |

OTHER PUBLICATIONS

European Search Report dated Feb. 9, 2009.

Japan Patent Office, Notice of Reasons for Refusal in Corresponding Application 2007-267391, Dated Apr. 4, 2012, 6 pages.

* cited by examiner

*Primary Examiner* — Thomas Lett

(74) *Attorney, Agent, or Firm* — Finnegan, Henderson, Farabow, Garrett & Dunner, L.L.P.

(57) ABSTRACT

In the image forming apparatus that forms an image on a sheet, an operation time measuring section that measures elapsed time that elapses from the point of time when the image forming apparatus arrives at its operable state and a controller that stops operations of the image forming apparatus when the elapsed time measured by the operation time measuring section arrives at a prescribed time are provided, whereby, a life span of the image forming apparatus influenced by temporal changes can be judged precisely, independently of the hours of operation of the image forming apparatus, and operations can be stopped.

8 Claims, 2 Drawing Sheets

IMAGE FORMING APPARATUS WITH TIME MEASURING SECTION FOR STOPPING OPERATION

This application is based on Japanese Patent Application No. 2007-267391 filed on Oct. 15, 2007 in Japanese Patent Office, the entire content of which is hereby incorporated by reference.

BACKGROUND OF THE INVENTION

The present invention relates to an image forming apparatus that forms an image on a sheet based on image data.

An image forming apparatus such as a copying machine and a printer is usually used ongoingly after installation, independently of a period of time after installation or after turning on electricity, or of the total hours of operation, unless it is disabled by troubles. However, from a viewpoint of a degree of safety, sufficient measures are not taken for troubles caused by deterioration of electric circuits mainly, especially of their constitutional parts, in the terminal stage of their lives, regarding safety measures in the case of occurrence of abnormal circumstances, although various protective circuits and safety devices are provided.

For this reason, when the apparatus is used, exceeding its mechanical life assumed at the time of design, there is a risk of occurrence of troubles caused by deteriorated parts for example, a decline of capacitance of a capacitor or removal of the soldered portion.

As an apparatus solving the aforesaid problems of mechanical life, there is given a power supply apparatus proposed in, for example, Unexamined Japanese Patent Application Publication No. 9-37461. In the power supply apparatus mentioned above, it is proposed to make it impossible to use the apparatus that has arrived at the end of its mechanical life, by providing an energization elapsed time measuring device that measures an energization period totally and a circuit operation stopping device that stops circuit operations through blowout of a fuse, on a power supply apparatus when the energization period exceeds a prescribed time.

Further, in Unexamined Japanese Patent Application Publication No. 54-153353, there is disclosed a proposed technology wherein the cooking time of a heating cooker, or the number of times of switching operations needed for cooking are totaled, and a power source is turned off when the cooking time or the number of switching operations arrives at a prescribed value.

In addition, Unexamined Japanese Patent Application Publication No. 4-80524, there is disclosed a proposed technology representing one described in Unexamined Japanese Patent Application Publication No. 54-153353 which has been improved not only to measure just only hours of use simply but also to correct the hours of use depending on levels of output in the course of operation.

However, each of all technologies shown in the aforesaid background art is one concerning measurement of life of such as a heating cooker, and a subject of measurement is substantially limited to the hours of operation of driving circuits for a heating device in the heating cooker. When operations of the aforesaid driving circuits are considered electrically, they represent mostly continuous working that is different from that of an image forming process in which various types of operations in an image forming apparatus are combined, thus, the aforesaid operations cannot be applied to the image forming apparatus.

In the case of an image forming apparatus, there are generated troubles caused not only by the hours of operation but also by temporal changes. When frequency in use for an image forming apparatus is low, many of parts constituting the apparatus preserve their sufficient capabilities even when the apparatus has been installed for considerable number of years, thus, a user judges that the apparatus has not arrived at the end of its life, and use of the apparatus is continued in many cases. Actually, however, in the case of an apparatus that has passed a prescribed period, the apparatus has some parts that have lost their safety as will be stated later. In this occasion, there are sometimes cases where the troubles are caused consequently.

A factor causing troubles in an image forming apparatus includes, for example, the followings. In a capacitor, a decline of capacitance proceeds by repetition of charge accumulation and charge emission. Though a semiconductor is housed usually in a resin package, it absorbs moisture with time, whereby, performance degradation is caused. In the soldered portion, cracks and removals are caused in addition to changes in resistance values caused by degeneration of the quality of the material for soldering. In the connector section, there is caused an increase of contact resistance resulted from oxidation on a surface. With respect to a motor, abrasion of a brush is caused when the motor is used, in the case of the so-called brush-type motor. In addition, in various portions of the circuit, declines of dielectric strength voltages on various insulated portions are caused by sticking and accumulation of dust.

In other words, in the image forming apparatus including electric circuits, there is a possibility of occurrence of troubles caused by temporal changes of circuits, independently of a energization period. For example, as stated above, resistance values are increased by degeneration of the quality of the material for soldering with the lapse of time in the soldered portion, and cracks and removals are caused on soldered joined portion by elastic forces of parts and of cables. Further, the so-called connectors are often used in these electric circuits, and their surfaces of contact portions are oxidized with the lapse of time, which sometimes causes generation of heat resulted from an increase of electrical resistance. In addition, sticking and accumulation of dust sometimes cause electric continuity between an electrically activated portion and a ground portion, depending on the state of installation.

SUMMARY

The present invention has been achieved based on a background of the aforesaid circumstances, and its objective is to provide an image forming apparatus wherein occurrence of troubles can be prevented in advance, by grasping a life of the image forming apparatus accurately and surely, and by stopping operations.

In the image forming apparatus of the invention, the first embodiment of the invention is represented by an image forming apparatus that forms an image on a sheet wherein there are provided an operation time measuring section that measures elapsed time from a point in time when the image forming apparatus becomes to be operable and a controller that stops the operation of the image forming apparatus when the elapsed time measured by the aforesaid operation time measuring section arrives at a prescribed time period.

The image forming apparatus of the second embodiment of the invention is represented by an image forming apparatus forming an image on a sheet wherein there are provided a power input time measuring section that measures elapsed time from the moment when power is inputted to the image forming apparatus and a controller that stops operations of the image forming apparatus when the elapsed time measured by the aforesaid power input time measuring section arrives at a prescribed time period.

The image forming apparatus of the third embodiment of the invention is represented by an image forming apparatus forming an image on a sheet wherein there are provided an operation time measuring section that measures elapsed time from a point in time when the image forming apparatus becomes to be operable, a power input time measuring section that measures elapsed time from the moment when power is inputted to the image forming apparatus, and a controller that stops operations of the image forming apparatus when either one of elapsed time measured by the aforesaid operation time measuring section and elapsed time measured by the aforesaid power input time measuring section arrives at a prescribed time period.

DETAILED DESCRIPTION OF THE PREFERRED EMBODIMENT

Figure 1:
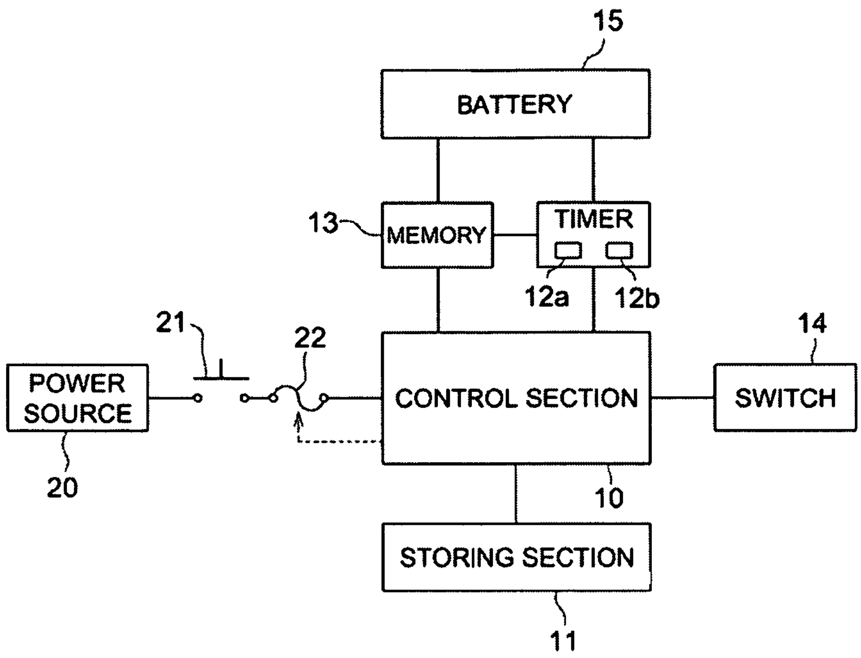
FIG. 1 is a block diagram showing an image forming apparatus in an embodiment of the invention.

In the invention, an operable elapsed time from a point of time when an apparatus becomes to be operable, or a power input elapsed time from a point of time when power is inputted is measured, then, the elapsed time is compared with a prescribed value set in advance in a controller, and when the operable elapsed time or the power input elapsed time exceeds the prescribed value, operations of the image forming apparatus are stopped as the life end of the apparatus.

As stated above, from a viewpoint of security of a degree of safety, it is necessary that the apparatus is made to be unoperable when a period of time assumed at the beginning is exceeded, even when frequency in use is low, and the hours of operation have not arrived at the life of the image forming apparatus, after the apparatus is installed in the user's side and power is activated on the apparatus.

The time measuring section for the elapsed time after installation and power application for the apparatus should not be suspended after its operation is started. A point of time for "power application deciding the start of operation of a timer" to establish the foregoing is needed to be clarified.

In general, the term of guarantee for an apparatus is set to be shorter than the period for which the design safety is secured, and even when several months are needed for a period of manufacture till delivery, the apparatus does not arrive at the end of its life span during a period from delivery till the end of the term of guarantee. Therefore, the aforesaid timer can stop the apparatus before the apparatus arrives at its life span end even if the abovementioned time is started after the delivery.

To attain this structure, it is possible to incorporate a switch that allows timer to start in the apparatus, or a program that conducts setting on software in the controller, and thereby to conduct setting for the switch or the program when shipping as a product, so that elapsed time can be measured from the moment when the power was applied first by a user who has purchased the apparatus. Therefore, the controller or the switch functions as an allowing section that allows the start of measurement for the elapsed time.

On the other hand, when setting is conducted on the apparatus after a long time from manufacturing of the apparatus, an occasion is supposed wherein some parts of the apparatus arrive at their life span ends before a long period has passed after the installation. In this case, it is necessary to discontinue the apparatus based on the elapsed time after the manufacturing, instead of the results of measurement of time from the aforesaid installation.

An image forming apparatus becomes ready to be capable of operating, after it has been assembled and inspected. An operation time measuring section can start measurement of elapsed time when the image forming apparatus becomes to be capable of operating. For example, the operation time measuring section can start measurement on a software basis, when the controller or the timer powered by a battery operates. It is further possible to start measurement by causing the timer to operate on a hardware basis through operation of a dip switch or the like. Therefore, the controller and the switch function as an allowing section that allows the start of measurement for the elapsed time. In this measurement, an operation time measuring section and a storing section that stores results of measurements are needed to be operated by batteries, because energization is not assured.

The aforesaid controller can be composed of CPU and of a program that causes the CPU to operate, and can be provided with ROM that stores a program and with RAM that stores data temporarily. Meanwhile, the prescribed value to be compared with the measured elapsed time can be stored in a storing section such as a flash memory, to be read out by the controller properly.

An occasion wherein the invention is applied to an electrophotographic printer that is an example of an image forming apparatus will be described as follows, referring to the drawings attached.

FIG. 1 is a block diagram showing a partial function of an image forming apparatus of the present embodiment.

Controller 10 is one for controlling the whole of the image forming apparatus, and it is composed mainly of CPU and of a control program that causes the CPU to operate, and in addition to these, it can be provided with ROM in which the control program is stored and with RAM that functions for temporary preservation of data and that functions as a work area.

First timer 12*a* and second timer 12*b* both connected to battery 15 and memory 13 that records a period of time measured by the first timer 12*a* and the second timer 12*b* are connected to the controller 10. These timers 12*a* and 12*b* are driven by built-in battery 15, separately from the power supply for the image forming apparatus main body, for the purpose of measuring elapsed time independently of energization and operation of the image forming apparatus.

To the controller 10, there is connected switch 14 that serves as an allowing section that allows measurement of the hours of operation passing from the moment of power application. Further, there is connected storing section 11 in which the prescribed time for judging a life span end of the apparatus is recorded. The storing section 11 can be composed of nonvolatile flash memory. The controller 10 is one to operate after power source 20 is connected, power input switch 21 and fuse 22 are provided between the power source and the controller 10, and the fuse 22 makes it possible for the controller 10 to control interception between power source 20 and the controller 10.

Figure 2:
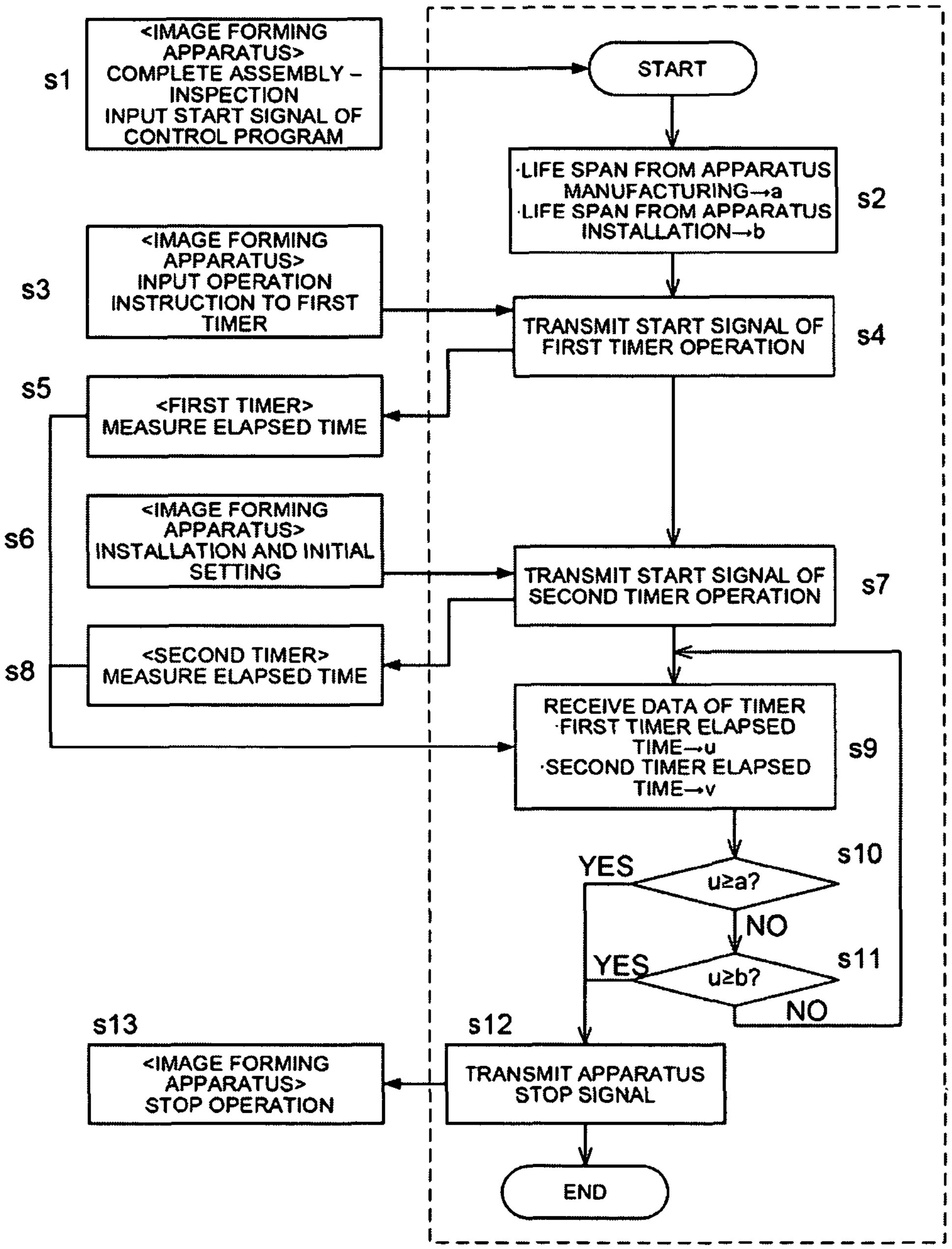
FIG. 2 is a flow chart showing procedures of judgment for the span of life of the image forming apparatus.

FIG. 2 is a flow chart showing a flow of a control program for the embodiment of the invention wherein the flow is related to an image forming apparatus and a timer included in an image forming apparatus.

The image forming apparatus is provided with a control program, two timers for measuring a life span and a circuit for stopping operations of the apparatus (fuse 22 in the present embodiment).

In the manufacturing course, at a point of time when an image forming apparatus becomes to be usable after assembly and inspection are completed, a signal for starting a control program is inputted, and operations of the control program in controller 10 are started (step s1).

The control program stores an upper limit of a life span of an apparatus from its manufacture that is set in advance and an upper limit of a life span of an apparatus from its installation that is set in advance, respectively in variables "a" and "b", and preserves their values in storing section 11 (step s2).

Following the signal for starting the aforesaid control program, and in synchronization with inputting of the signal to start the program, timer operation instruction input is conducted (step s3), and the signal for starting is transmitted to first timer 12*a* (step s4). The first timer 12*a* receives this signal, and starts measuring elapsed time from the moment when the apparatus becomes to be operable (step s5), and stores the elapsed time in variable "u" and preserves the value in memory 13 (step s9).

After that, when the apparatus is installed in the ordinary environment for use, then, power input switch 21 is turned on and various initial setting and connection to computers are conducted (step s6), a signal for starting is transmitted to second timer 12*b* (step s7). The second timer 12*b* receives this signal, and starts measuring elapsed time from the moment when the apparatus becomes to be operable (step s8), and stores elapsed time in variable "v" and preserves the value in memory 13 (step s9).

In this case, measurement is started under the condition that the aforesaid switch 14 is set to the measurement allowing side. Setting of the switch 14 can be conducted at a point of time when an image forming apparatus becomes to be capable of operating through completion of assembling and inspection, and it is also possible to set in synchronization with occasions of various initial setting. It is further possible to employ the structure wherein an allowance item for measurement is included in setting items for initial setting and the measurement starting signal is transmitted when the allowance item is inputted without depending on the switch.

Each of the first timer 12*a* and the second timer 12*b* measures elapsed time continuously, independently of on and off of power source 20 of an image forming apparatus, and transmits the measured values periodically to the control program. The control program stores the measured values of the first timer 12*a* in variable "u" and stores the measured values of the second timer 12*b* in variable "v", respectively, and preserves them in memory 13.

On the controller 10, variable "u" and variable "v" both stored in memory 13 are read out, while, variables "a" and "b" both indicating a limit of a life span are read out from storing section 11, and variable "u" is compared with variable "a" and variable "v" is compared with variable "b". When variable "u" or "v" is not lower than variable "a" or "b", and when at least either of them is judged to have arrived at the life span end (step s10: YES or step s11: YES), the control program transmits an apparatus stop signal (step s12), while, when none of them has arrived at the life span end, measurement is continued and the comparison between variables is continued.

The image forming apparatus which has received the apparatus stop signal from the control program causes the apparatus stop circuit to operate to stop the apparatus, so that use of the apparatus thereafter is made to be impossible (step s13). In the present embodiment, fuse 22 is controlled so that energization is intercepted, and use of the apparatus is made to be impossible.

Even while copying operations are continued, if the foresaid conditions are satisfied, the apparatus is stopped suddenly, which is inconvenient for a user, because the user cannot obtain targeted copies. Further, there is a possibility that sheets are left in the apparatus, and various mechanisms inside the apparatus are stopped without returning to their home positions. In this case, therefore, it is convenient to make an apparatus stop signal after a series of copying operations are completed. In this case, it is desirable to give a warning informing that the apparatus cannot be used after a series of copying operations are completed, on the operation section.

When a short period of time is left in a life span of the apparatus, it is also considered to be preferable, from a user friendly viewpoint, to give the aforesaid warning at a point of time when the quantity of copies which can be made during the remainder of the life span of the apparatus has arrived at a prescribed value or lower.

The structure for stopping operations of an image forming apparatus may be a circuit for a power source to intercept supply of power like that stated above, and as a specific structure for the circuit, those using a fuse or using a breaker, that intercepts energization when excessive current flows, can be used.

In the aforesaid embodiment, operable elapsed time from the moment when the apparatus becomes to be capable of operating and power input elapsed time from the moment when power is applied are measured, and each of them is compared with a prescribed time to judge a life span end, and it is also possible to judge a life span end by comparing either one of the elapsed time with a prescribed value.

Though the invention has been described above, based on the aforesaid embodiment, the invention is not limited to the contents of the aforesaid description, and the invention may be modified properly without departing from the scope of the invention.

As described above, the image forming apparatus of the invention is represented by an image forming apparatus forming an image on a sheet and outputting the sheet wherein either one or both of an operation time measuring section that measures elapsed time that elapses from the point of time when the image forming apparatus arrives at its operable state and a power input time measuring section that measures elapsed time that elapses from the moment when power is applied for the image forming apparatus, are provided, and a controller that stops operations of the image forming apparatus when the elapsed time measured by either one or both of the aforesaid operation time measuring section and power input time measuring section arrives at a prescribed value, is provided, thus, a life span of the image forming apparatus influenced by temporal changes can be judged precisely independently of the operating time of the image forming apparatus, and operations can be stopped. In particular, the elapsed time measured by the operation time measuring section and that measured by the power input time measuring section are compared with a prescribed value for judgment of the life span, whereby, a life span of the apparatus can be judged precisely independently of the operating conditions.

What is claimed is:

1. An image forming apparatus which forms an image on a sheet, the image forming apparatus comprising:

a control section including a program for controlling the image forming apparatus; and an operation time measuring section which starts to measure first elapsed time based on a first start signal to start the program for a first time when power becomes on for a first time, after the image forming apparatus becomes in an operable state after completion of manufacturing of the image forming apparatus and before installation thereof in a user's side and continues to measure the first elapsed time independently of a subsequent start signal to start the program after the first start signal and independently of on and off of power of the image forming apparatus thereafter, wherein the control section stops operation of the image forming apparatus by determining that an end of life span of the image forming apparatus has been reached when the first elapsed time measured by the operation time measuring section arrives at a prescribed time period.

2. The image forming apparatus of claim 1, further comprising, an allowing section which allows a measurement start of the first elapsed time after the installation in the user's side.

3. The image forming apparatus of claim 1, wherein when the control section stops the operation of the image forming apparatus by determining that the end of life span of the image forming apparatus has been reached, the control section makes use of the apparatus impossible thereafter.

4. An image forming apparatus which forms an image on a sheet, the image forming apparatus comprising:

a power input time measuring section which measures elapsed time;

a control section which stops operation of the image forming apparatus when the elapsed time measured by the power input time measuring section arrives at a prescribed time period; and an allowing section which allows a measurement start of the elapsed time, wherein the power input time measuring section starts to measure the elapsed time when power is inputted to the image forming apparatus for a first time after the allowing section allows the measurement start of the elapsed time after installation of the image forming apparatus in a user's side and continues to measure the elapsed time independently of on and off of the power after the first time power is inputted and wherein the control section stops operation of the image forming apparatus by determining that an end of life span of the image forming apparatus has been reached when the elapsed time measured by the power input time measuring section arrives at a prescribed time period.

5. The image forming apparatus of claim 4, wherein when the control section stops the operation of the image forming apparatus by determining that the end of life span of the image forming apparatus has been reached, the control section makes use of the apparatus impossible thereafter.

6. An image forming apparatus which forms an image on a sheet, the image forming apparatus comprising:

an operation time measuring section which starts to measure first elapsed time based on a first start signal to start a program when power becomes on for a first time, after image forming apparatus becomes in an operable state after completion of manufacturing of the image forming apparatus and before installation thereof in a user's side and continues to measure the first elapsed time independently of on and off of power of the image forming apparatus thereafter;

a power input time measuring section which starts to measure second elapsed time when power is inputted to the image forming apparatus for a first time after the installation in the user's side and continues to measure the second elapsed time independently of on and off of the power after the first time power is inputted after the installation in the user's side; and a control section which stops operation of the image forming apparatus determining that an end of life span of the image forming apparatus has been reached when either one of the first elapsed time measured by the operation time measuring section and the second elapsed time measured by the power input time measuring section arrives at a prescribed time period.

7. The image forming apparatus of claim 6, further comprising:

an allowing section which allows a measurement start of the second elapsed time after the installation in the user's side.

8. The image forming apparatus of claim 6, wherein when the control section stops the operation of the image forming apparatus by determining that the end of life span of the image forming apparatus has been reached, the control section makes use of the apparatus impossible thereafter.

* * * * *